United States Patent
Luo et al.

(10) Patent No.: US 9,941,793 B2
(45) Date of Patent: Apr. 10, 2018

(54) SNUBBER FOR VOLTAGE REGULATION

(71) Applicant: DELL PRODUCTS, LP, Round Rock, TX (US)

(72) Inventors: Shiguo Luo, Austin, TX (US); Hang Li, Austin, TX (US); Kejiu Zhang, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/211,545

(22) Filed: Jul. 15, 2016

(65) Prior Publication Data

US 2018/0019672 A1    Jan. 18, 2018

(51) Int. Cl.
*H02H 7/122*    (2006.01)
*H02M 3/158*    (2006.01)
*H02M 1/34*    (2007.01)

(52) U.S. Cl.
CPC ............. *H02M 3/158* (2013.01); *H02M 1/34* (2013.01)

(58) Field of Classification Search
CPC ............. H02M 3/33592; H02M 3/335; H02M 2001/342; Y02B 70/1491; H02P 29/024
USPC ... 363/20, 21.04, 21.06, 21.14, 56.11, 56.05, 363/89, 98, 127
See application file for complete search history.

(56) References Cited

U.S. PATENT DOCUMENTS

| | | | |
|---|---|---|---|
| 6,211,792 B1* | 4/2001 | Jadric | H02H 7/0844 |
| | | | 318/800 |
| 6,771,521 B1 | 8/2004 | Xiong et al. | |
| 6,882,548 B1* | 4/2005 | Jacobs | H02M 1/34 |
| | | | 363/127 |
| 6,947,297 B2 | 9/2005 | Ke et al. | |
| 6,987,675 B2* | 1/2006 | Jovanovic | H02M 1/34 |
| | | | 363/21.01 |
| 7,158,393 B2* | 1/2007 | Schneider | H02J 3/1842 |
| | | | 363/34 |
| 7,813,149 B2 | 10/2010 | Popescu et al. | |
| 7,869,235 B2 | 1/2011 | Lin et al. | |
| 8,513,931 B2 | 8/2013 | Tong et al. | |
| 8,659,273 B2 | 2/2014 | McDonald et al. | |
| 9,114,281 B2 | 8/2015 | Divan et al. | |
| 9,236,789 B1 | 1/2016 | Li et al. | |
| 9,473,023 B2* | 10/2016 | Vannorsdel | H02M 3/156 |
| 2007/0139983 A1 | 6/2007 | Johnson et al. | |
| 2014/0313627 A1 | 10/2014 | Li et al. | |
| 2015/0061530 A1 | 3/2015 | Kang | |
| 2015/0124500 A1 | 5/2015 | Li et al. | |
| 2016/0087541 A1* | 3/2016 | Xie | H02M 3/33592 |
| | | | 363/21.06 |

* cited by examiner

*Primary Examiner* — Rajnikant Patel
(74) *Attorney, Agent, or Firm* — Larson Newman, LLP

(57) ABSTRACT

A voltage regulator includes circuitry for regulating a voltage output of the voltage regulator and a snubber circuit. The snubber circuit includes a switching device which is controlled to electronically connect or disconnect the snubber circuit with the circuitry of the voltage regulator device. The switching device may be controlled by a controller based on one or more parameters indicating a load of the voltage regulator device.

16 Claims, 5 Drawing Sheets

SNUBBER FOR VOLTAGE REGULATION

FIELD OF THE DISCLOSURE

The present disclosure generally relates to information handling systems, and more particularly relates to a snubber for voltage regulation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A voltage regulator includes circuitry for regulating a voltage output of the voltage regulator and a snubber circuit. The snubber circuit includes a switching device that is controlled to electronically connect or disconnect the snubber circuit with the circuitry of the voltage regulator. The switching device may be controlled by a controller based on one or more parameters indicating a load of the voltage regulator.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system generally processes, compiles, stores, or communicates information or data for business, personal, or other purposes. Many information handling systems, such as servers, include processors for processing data. The power requirements for processors for servers and other processors are increasing. Processors may be implemented in semiconductors and include voltage regulators (VRs). Thus, semiconductors may include VR devices and processors may include VRs for outputting a desired voltage or power.

Embodiments of VR circuitry may use switching for voltage regulation and may include one or more switching elements. VR circuitry may experience switching noise and voltage spikes from ringing waveforms due to switching within the VR circuitry. To control or mitigate ringing and voltage spikes in a VR, resistor/capacitor snubber circuits have been used with a desired resistance connected in series with a desired capacitance and coupled to the voltage output of a VR to mitigate or control ringing of the VR output.

Embodiments of VRs may output a desired voltage using switching. The switching devices used for the switching in VR circuitry may be semiconductors such as transistor devices. An example arrangement of transistor devices in a VR is a pair of MOSFET devices coupled in series.

Resistance/capacitance (RC) snubber circuits have been used to mitigate ringing. An RC snubber circuit may cause voltage regulator efficiency across the whole load range of the VR regulator to suffer. That is, a typical RC snubber will cause the VR in which it is used to suffer unwanted power dissipation corresponding to the energy stored in the capacitor of the RC snubber multiplied by the switching frequency of the voltage regulating switches of the VR circuitry.

A switch with an on resistance may be used in conjunction with a capacitance to provide a snubber circuit that can be electrically connected or disconnected from VR circuitry by controlling the switch. Thus in high load situations, or when the VR is under strain, the snubber circuit may be connected to VR circuitry by switching to mitigate ringing and voltage spikes; in low load situations, the snubber circuit may be disconnected from the VR circuitry by switching such that the snubber circuitry does not cause power dissipation with regard to the VR output. Such a snubber circuit may be referred to as a smart snubber.

Figure 1:
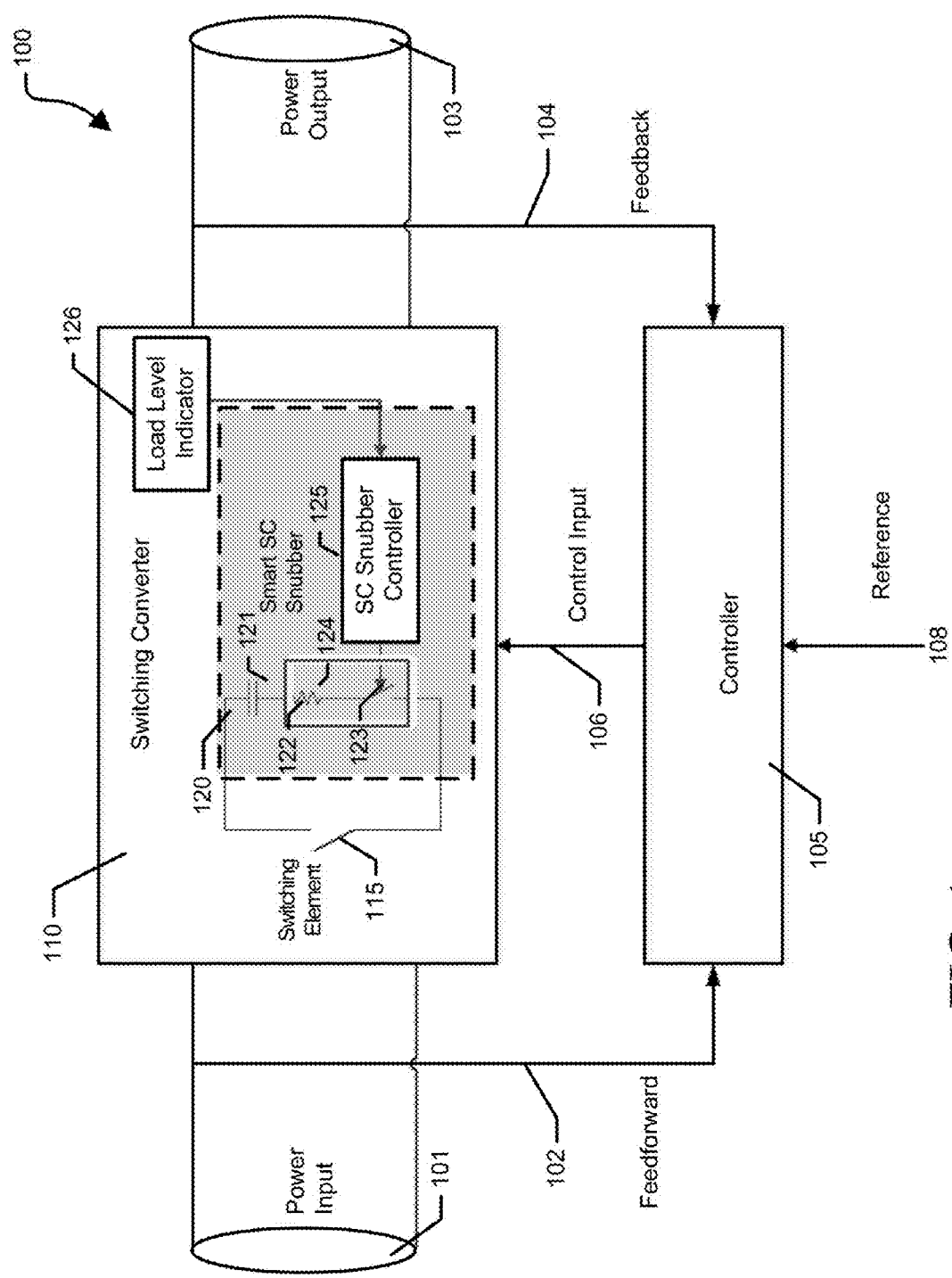
FIG. 1 is a block diagram of a voltage regulator, according to an embodiment of the present disclosure.

FIG. 1 shows voltage regulator 100 equipped with a snubber circuit that may be electrically connected or disconnected with voltage regulation circuitry to control or mitigate ringing and noise. FIG. 1 illustrates a generalized application of a smart snubber to a voltage regulator. Voltage regulator 100 includes switching converter 110. Switching converter 110 in turn includes switching element 115 and snubber circuit 120. Snubber circuit 120 includes capacitor 121 and switching device 122 coupled in series with capacitor 121 as shown. Switching device 122 includes switch 123 and resistance 124. Switching device 122 may be a transistor such as a FET which provides switch 123 and has a source-drain resistance 124 when on. Capacitor 121 and switching device 122 are chosen for snubber circuit 120 to provide a desired capacitance and desired resistance for snubber circuit 120. Switch 123 of switching device 122 is controlled by snubber controller 125 based on a load level indication from load level indicator 126.

In operation, switching converter 110 is controlled by controller 105 via control input 106 from controller 105. Switching converter 110 receives power input 101 and outputs power output 103 based on control input 106 from controller 105. Controller 105 receives an indication 102 of power input 101 via a feedforward and an indication 104 of power output 103 via a feedback. Controller 105 may also receive further input 108 from, for example a controller or processor. Controller 105 outputs control input 106 to switching converter 110 to control switching converter 110 based on indications 102 and 104, and further input 108.

If there is a large load at power output 103, for example as detected by load level indicator 126, then it may be desirable to electrically connect snubber circuit 120 to switching converter 110. To this end, switch 123 of switching device 122 is controlled by snubber controller 125 to electrically connect capacitor 121 to switching converter 110. For example, when switching device 122 is a FET, the FET may be turned on such that a source-drain connection with resistance 124 electrically connects capacitor 121 with switching converter 110 to electrically connect snubber circuit 120 with capacitor 121 and resistance 124 to switching converter 110.

Load level indicator 126 may detect a voltage at power output 103, a current flow at power output 103, an increase in temperature indicating a high load at power output 103, a power output, or an indication thereof. While not illustrated in FIG. 1, load level indicator 126 may be one or more sensors located in the vicinity of power output 103 to monitor the load relative to power output 103. Snubber controller 125 may compare data from load level indicator 126 with a threshold and based upon the comparison, control switch 123 of switching device 122 to electrically connect or electrically disconnect snubber circuit 120 with switching converter 110.

If, for example snubber controller 125 compares data from load level indicator 126 with a threshold and determines the data is below the threshold, indicating a snubber circuit is not needed to control or mitigate ringing and that power dissipation of power output 103 is an issue due to the electrical connection of snubber circuit 102 with switching converter 110, then, snubber controller may control switch 123 of switching device 122 to electrically disconnect snubber circuit 120 from switching converter 110. Because snubber circuit 120 may be electrically connected or disconnected with switching converter 110 based on detected load indications, snubber circuit 120 may be considered a smart snubber.

Snubber controller 125 may be located external to switching converter 110. As would be understood from the above, snubber circuit 120 may be electrically connected and disconnected with switching converter 110 dynamically and in real-time based on data from load level indicator 126 such that dynamic changes in load may dynamically change whether snubber circuit 120 is used to mitigate or control ringing and noise.

Figure 2:
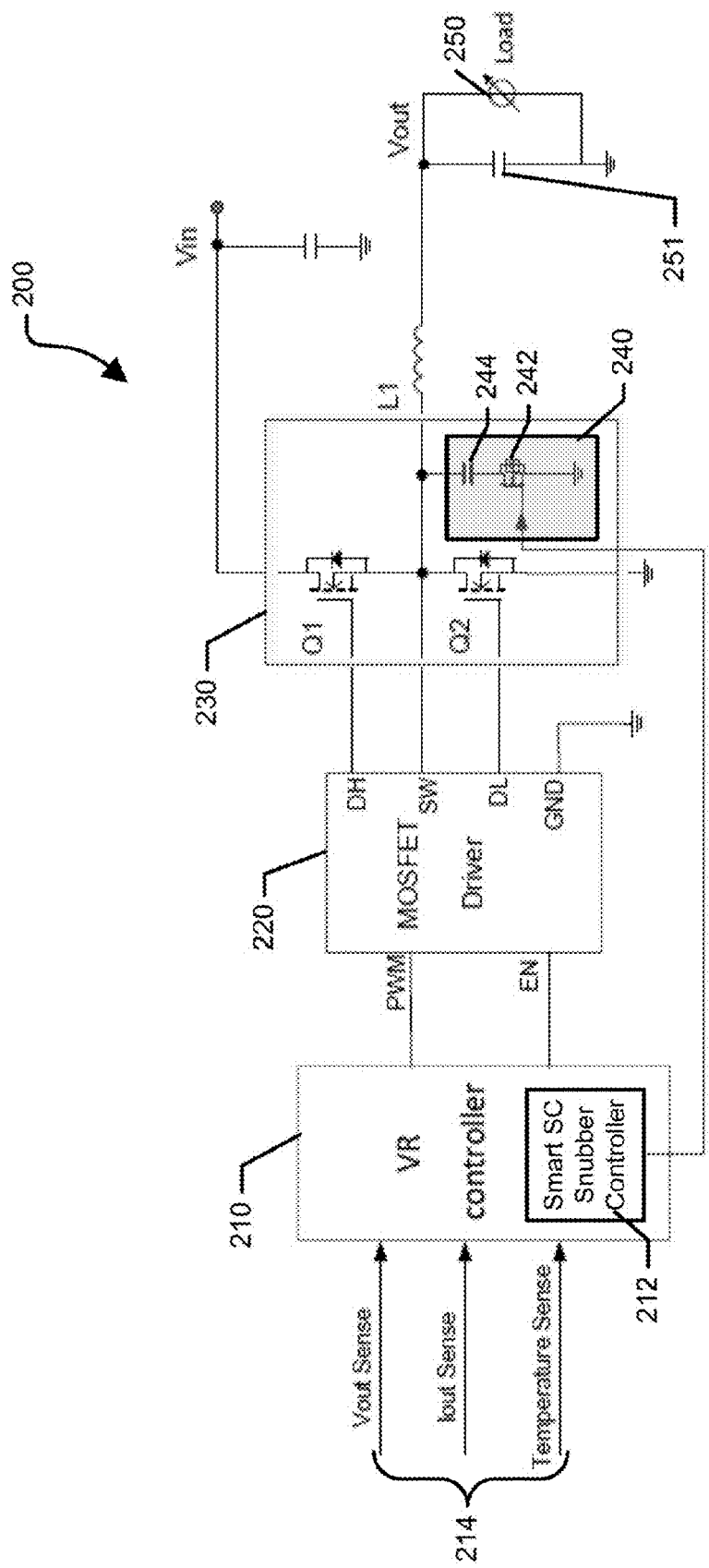
FIG. 2 is another block diagram of the voltage regulator, according to an embodiment of the present disclosure.

FIG. 2 show a voltage regulator 200 equipped with a snubber circuit that may be electrically connected or disconnected with voltage regulation circuitry to control or mitigate ringing and noise of the voltage regulator. FIG. 2 illustrates an application of a smart snubber to a particular embodiment of voltage regulator circuitry, namely a switching voltage regulator.

Voltage regulator 200 includes controller 210, driver 220, and switching circuit 230, which includes snubber circuitry 240. Snubber circuitry 240 includes switching device 242 and capacitor 244. Switching device 242 may be a transistor device such as a MOSET with a desired snubber circuit resistance between source and drain when switching device 242 is in an on state. Controller 210 is coupled to driver 220 to drive switching circuit 230. More particularly, switching circuit 230 comprises transistors Q1 and Q2 which may be MOSFETS. Q1 may be coupled to voltage input Vin, as shown. Transistors Q1 and Q2 are coupled in series and the point of coupling between Q1 and Q2 is coupled to an inductance L1 to provide a voltage output Vout to a load 250 and a output capacitance 251. The point of coupling between Q1 and Q2 is further coupled to snubber circuitry 240 via switching device 242 such that switching device 242 may electrically connect or disconnect snubber circuitry 240 with the point of coupling between Q1 and Q2. Switching device 242 is controlled by snubber controller module 212 of controller 210.

In operation of voltage regulator 200, controller 210 controls driver 220 to control switching of transistors Q1 and Q2 of switching circuit 230 to output a desired voltage Vout. More particularly, driver 220 comprises a high driver coupled to the gate of transistor Q1 to switch transistor Q1 and a low driver coupled to the gate of transistor Q2 to switch transistor Q2 such that switching transistors Q1 and Q2 in a synchronization outputs a desired output Vout. The point of coupling between Q1 and Q2 is coupled to snubber circuitry 240 via switching device 242 which is controlled by snubber controller 212 of controller 210 to electrically connect or disconnect snubber circuitry 240 with the point of coupling between Q1 and Q2, thereby activating or deactivating snubber circuit 240 with regard to switching circuit 230 and voltage regulator 200 generally.

To determine whether to electrically connect or disconnect snubber circuitry 240 with the point of coupling between Q1 and Q2, thereby activating or deactivating snubber circuit 240 with regard to switching circuit 230, controller 210 may receive one or more feedback inputs 214 indicating load 250 on voltage regulator 200. Feedback inputs 214 may include an indication of Vout, an indication of current output (Iout), a power output indication, or an indication of temperature. Feedback inputs 214 may be provided by one or more sensors, for example a sensor residing inside of driver 220, indicating a current or voltage output of switching circuit 230, or a temperature sensor located in the region of a load connection to load 250. Feedback inputs 214 indicate a relative load on voltage regulator 200 and thus whether snubber circuit 240 should be electrically connected to switching circuit 230 to minimize ringing and noise due to switching transistors Q1 and Q2.

Feedback inputs 214 may be provided to snubber controller 212 and snubber controller may compare feedback inputs 214 indicating the load on switching circuit 230 with one or more programmed thresholds to determine whether to electrically connect or disconnect snubber circuit 240 with switching circuit 230. Based on this comparison of feedback inputs 214 with one or more threshold, snubber controller 212 may either control switching device 242 to be in the on state to electrically connect snubber circuit 240 with switching circuit 230, or may control switching device 242 to be in the off state to electrically disconnect snubber circuit 240 from switching circuit 230. When comparison of feedback inputs 214 with one or more programmed thresholds indicates that switching circuit 230 is experiencing heavy load, switching device 242 may be controlled to electrically connect snubber circuit 240 with switching circuit 230 to mitigate or control ringing and noise due to switching under high load.

Figure 3:
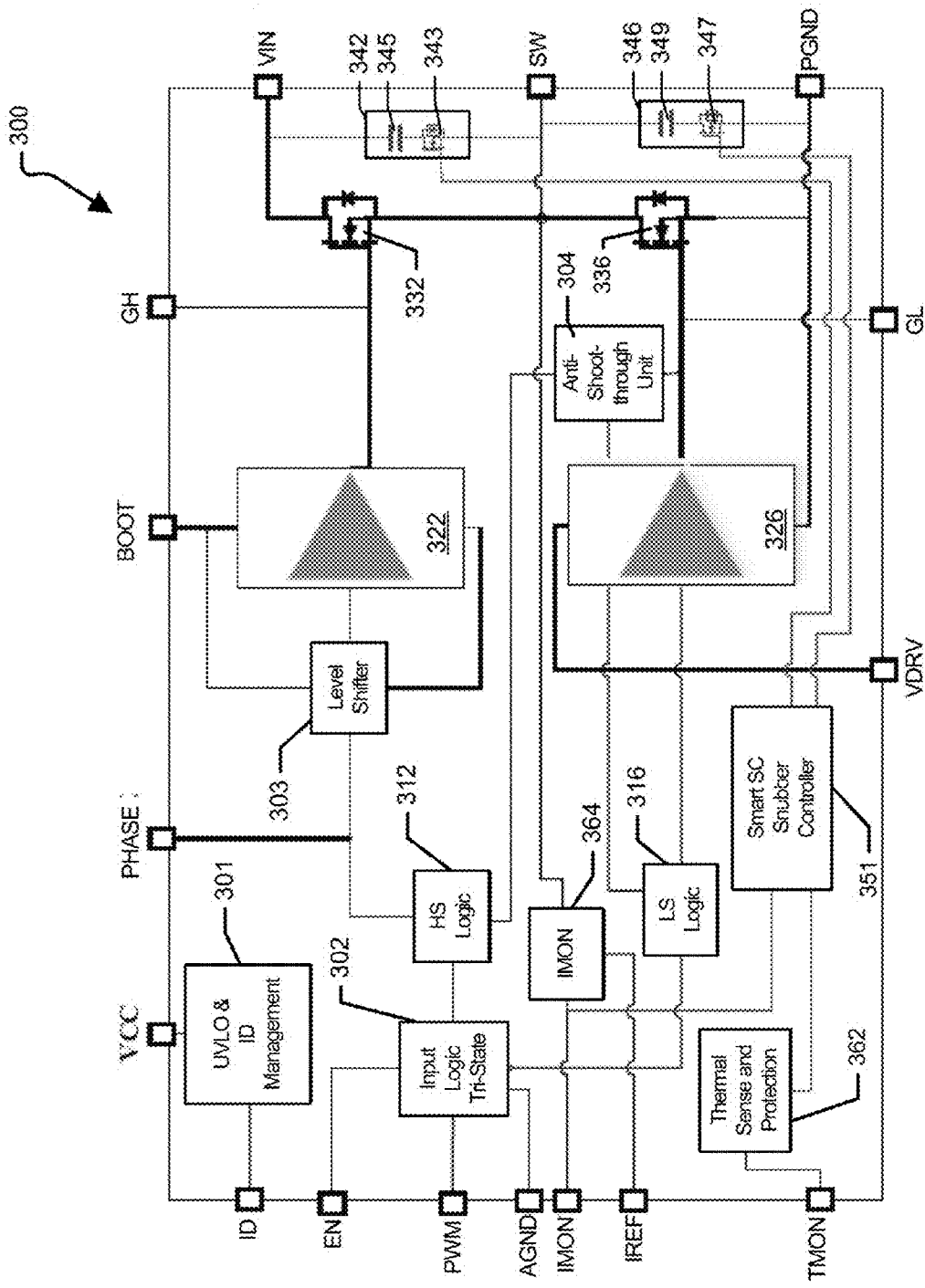
FIG. 3 is a block diagram of an integrated semiconductor implementing an embodiment of the voltage regulator, according to an embodiment of the present disclosure.

FIG. 3 shows an integrated semiconductor 300 implementing a voltage regulator equipped with a snubber circuit that may be electrically connected or disconnected with voltage regulation circuitry to control or mitigate ringing and noise. FIG. 3 illustrates an integration of a smart snubber with a particular embodiment of voltage regulator circuitry implemented in a silicon device.

Integrated semiconductor 300 includes undervoltage lockout (UVLO) circuitry 301, input logic circuitry 302, level shifter module 303, and anti-shoot-through circuitry 304. Level shifter module 303 is operable to shift a voltage level up or down, and anti-shoot-through circuitry 304 is circuitry configured to prevent switching both MOSFETs at the same time in the voltage regulator implemented by semiconductor 300 and shorting a voltage to ground.

Integrated semiconductor 300 also includes logic 312, logic 216, driver 322, driver 326, switching transistor 332, switching transistor 336, snubber circuit 342, and snubber circuit 346. Integrated semiconductor 300 also includes snubber controller 351, temperature monitoring logic 362, and current monitoring logic 364. Switching transistors 332 and 336 may be MOSFET devices. Logic 312 may be considered high side or high voltage logic and controls driver 322 which may be considered the high side or high voltage driver. Driver 322 drives switching transistor 332 to regulate voltage and switching transistor 332 may be considered the high side or high voltage switching transistor. Logic 312, driver 322, and switching transistor 332 may regulate a supply voltage provided to semiconductor 300 and as such are considered high side or high voltage logic because these elements regulate the 'high' voltage of semiconductor 300.

Logic 316 may be considered low side or low voltage logic and controls driver 326 which may be considered the low side or low voltage driver. Driver 326 drives switching transistor 336 to regulate voltage and switching transistor 336 may be considered the low side or low voltage switching transistor. Logic 316, driver 326, and switching transistor 336 may regulate switching relative to the ground (or low voltage) plane in semiconductor 300 and as such are considered low side or low voltage logic because these elements regulate switching with regard to the ground or low voltage plane of semiconductor 300.

In the embodiment illustrated in FIG. 3, semiconductor 300 has two snubber circuits: snubber circuit 342 and snubber circuit 346. Snubber circuit 342 may be considered the high side or high voltage snubber circuit because circuit 342 is coupled to the supply or voltage input (Vin) while snubber circuit 346 may be considered the low side or low voltage snubber circuit because circuit 346 is coupled to the ground or low voltage plane (PGND). Both snubber circuit 342 and snubber circuit 346 are physically coupled to the voltage output (SW) of semiconductor 300. The voltage output (SW) of semiconductor 300 may be coupled to a load (not shown) via an inductance (not shown). As shown, snubber controller 351 is connected to and controls snubber circuits 342 and 346.

Snubber circuit 342 includes switching device 343 and capacitor 345. Switching device 343 may be a switching transistor with a desired drain-source resistance when in the on state. Snubber circuit 346 includes switching device 347 and capacitor 349. Switching device 347 may be a switching transistor with a desired drain-source resistance when in the on state. Snubber controller 351 is coupled to control switching devices 343 and 347, for example, by coupling to the respective gates of switching devices 343 and 347. Snubber controller 351 is configured to electrically connect and disconnect snubber circuits 342 and 346 to the voltage output (SW) of semiconductor 300 to control or mitigate ringing and noise of the switching circuit comprising switching transistors 332 and 336. That is, snubber controller 351 is coupled to switching devices 343 and 347 to individually control switching devices 343 and 347 to be on the on state or the off state, thereby controlling whether corresponding snubber circuits 342 and 346 are electrically connected or electrically disconnected to the switching circuitry of semiconductor 300.

Snubber controller 351 individually controls switching devices 343 and 347 to be on the on state or the off state based on input from current monitoring logic 364 or input from temperature monitoring logic 362. Current monitoring logic 364 monitors a current output of semiconductor 300 to a load and temperature monitoring logic 362 monitors a temperature in the vicinity of the switching circuit of semiconductor 300. Either increased current or heightened temperatures may indicate a stress on semiconductor 300 and a need to electrically connect at least one of snubber circuits 342 and 346.

In operation of semiconductor 300, current monitoring logic 364 and temperature monitoring logic 362 monitor current output and temperature, respectively. The current and temperature results of the monitoring may be provided to snubber controller 351 which may compare the current or temperature with a threshold indicating a high power output or high relative temperature. If the comparison with the threshold indicates a need to reduce strain on the circuit and switching elements, then snubber controller may control at least one of switching devices 343 and 347 to be in the on state and thus electrically connecting the respective snubber circuit 342 and 346 to switching circuitry of semiconductor 300. In embodiments, current monitoring logic 364 and temperature monitoring logic 362 monitor current output and temperature of semiconductor 300 dynamically in real time and snubber controller 351 may compare data received from current monitoring logic 364 and temperature monitoring logic 362 with one or more thresholds dynamically in real time and, in response, control snubber circuits 342 and 346 to be connected or disconnected dynamically and in real time. That is, if temperature or current rise beyond a threshold, indicating a strain on switching circuitry, one or more of snubber circuits 342 and 346 may be electrically connected as needed to mitigate or control ringing or noise; if, however, temperature or current are below a threshold, one or more of snubber circuits 342 and 346 may be electrically disconnected to reduce power dissipation in switching circuitry.

Figure 4:
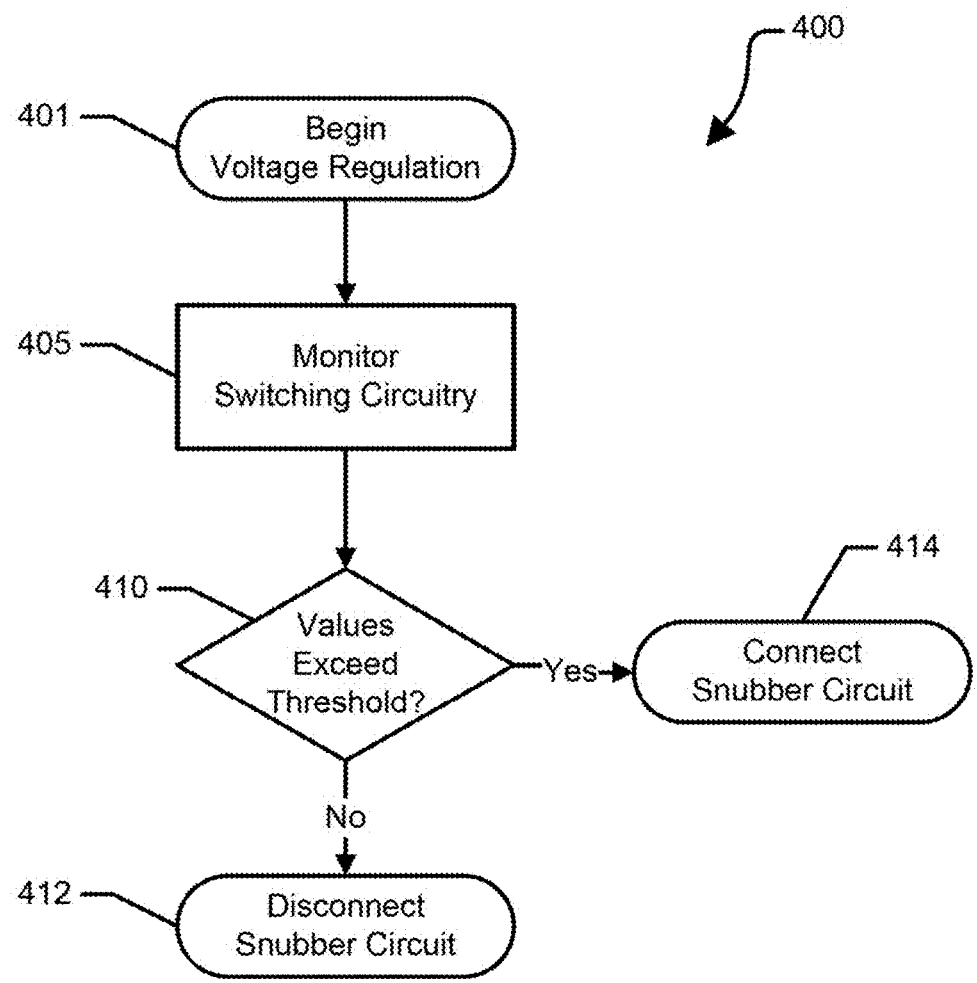
FIG. 4 is a flow diagram illustrating a method for using a snubber or circuit in switching circuitry of a voltage regulator, according to an embodiment of the present disclosure.

FIG. 4 shows a method 400 for using smart snubber circuits in switching circuitry according to the disclosure herein. Method 400 may be used, for example, with voltage regulator 200 or semiconductor 300. At 401, voltage regulation begins. In a voltage regulator using switching circuitry for voltage regulation, such as voltage regulator 200 or semiconductor 300, the switches, for example switching transistors, of the switching circuitry begin to be turned on and off in a synchronization to provide a regulated voltage to a load. At 405, the switching circuitry is monitored. For example, the power output of the switching circuitry may be monitored, or a temperature of the switching circuitry is monitored. To monitor power output, a current or voltage of the switching circuitry may be monitored.

At 410, the values detected at 405 are compared with one or more thresholds. This comparison may be performed with snubber circuit control circuitry as described herein. For example, temperature values from monitoring the temperature of the switching circuitry may be compared with one or more threshold values. Similarly, current values or voltage values from monitoring the switching circuitry may be compared with one or more threshold values. If the monitored values do not exceed one or more threshold values, then 412, the snubber circuit may be electrically disconnected from or not electrically connected to the switching circuitry such that the snubber circuit does not affect the switching circuitry. If, however, the monitored values exceed one or more threshold values, then 414, the snubber circuit may be electrically connected to the switching circuitry such that the snubber circuit mitigates or controls ringing or noise in the switching circuitry. A monitored value exceeding a threshold value may indicate a high load or strain on switching circuitry and a consequent need to mitigate to control ringing or noise.

As would be understood by one of skill in the art, 405 and 410 may be repeated, for example, periodically, in a snubber circuit controller such that the snubber circuit is applied to switching circuitry dynamically as needed when the switching circuitry is under high load or strain, as indicated by the monitored values.

Figure 5:
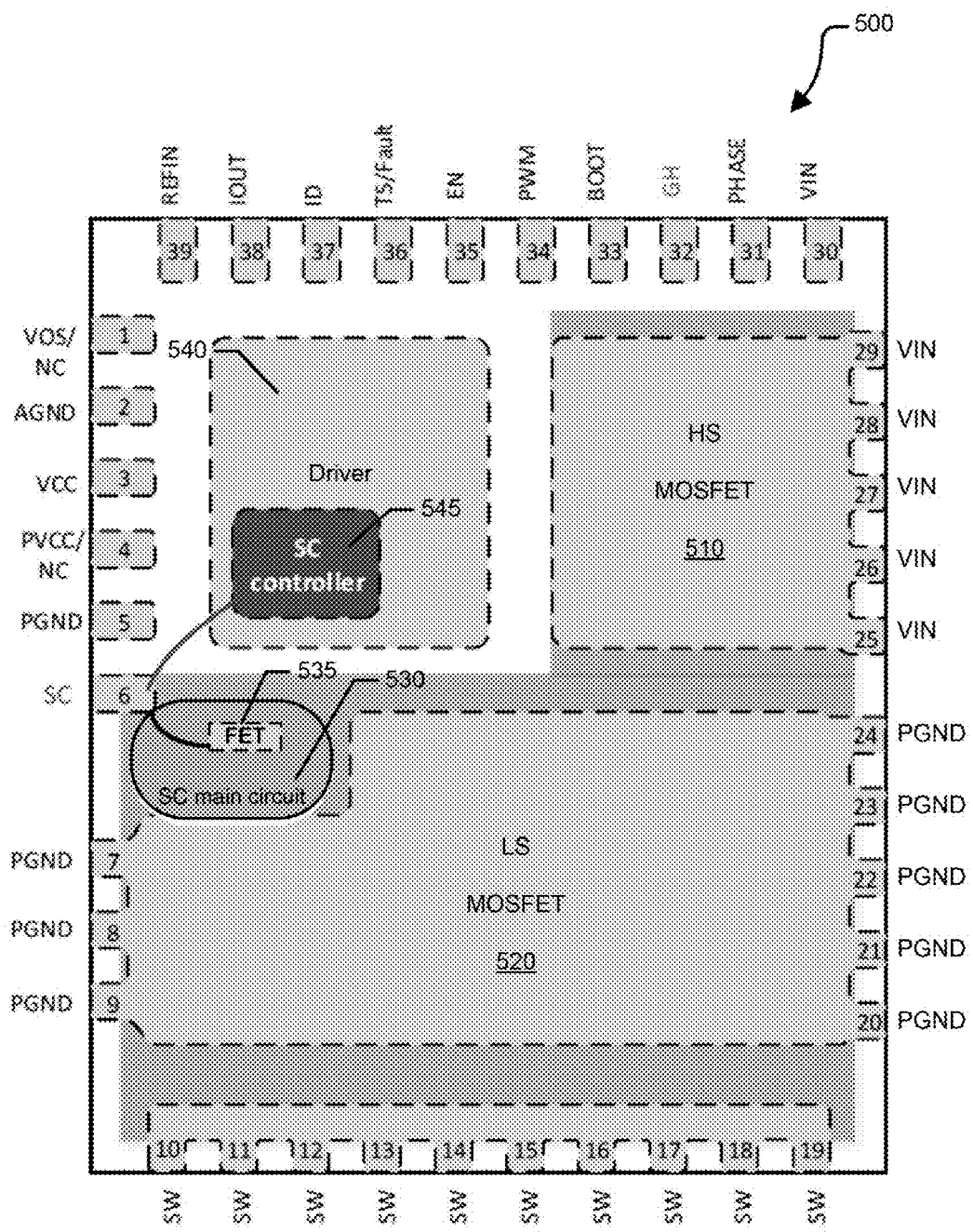
FIG. 5 is a block diagram of an integrated semiconductor implementing an embodiment of the voltage regulator, according to an embodiment of the present disclosure.

FIG. 5 shows an integrated semiconductor 500 implementing a voltage regulator equipped with a snubber circuit which may be electrically connected or disconnected with voltage regulation circuitry to control or mitigate ringing and noise. FIG. 5 illustrates an integration of a smart snubber with a particular embodiment of voltage regulator circuitry implemented in a semiconductor.

Integrated semiconductor 500 comprises MOSFET 510, MOSFET 520, snubber circuit 530, and driver 540. MOSFET 510 may be considered a high side or high voltage switching transistor and forms part of switching circuitry of the voltage regulator. MOSFET 520 may be considered a low side or low voltage switching transistor and forms part of switching circuitry of the voltage regulator. Snubber circuit 530 comprises a FET 535 which acts as the switching device of snubber circuit 530 for electrically connecting or disconnecting snubber circuit 530 from switching circuitry. Driver 540 comprises snubber controller 545. Snubber controller 545 is electrically coupled to control the gate of FET 535 to control electrically connecting or disconnecting snubber circuit 530 from switching circuitry. As shown, in FIG. 5, snubber circuit 530 can be implemented in the same semiconductor material as MOSFET 520 and MOSFET 510 such that snubber circuit 530 is integrated with MOSFET 520 and MOSFET 510.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A voltage regulator comprising:
   voltage regulator circuitry;
   a snubber circuit including a switching device, the switching device configured to electrically connect or disconnect the snubber circuit with the voltage regulator circuitry based upon a snubber control, and
   the snubber controller configured to provide the snubber control based on one or more detected values including a power output of the voltage regulator circuitry or a temperature in the vicinity of the switching circuitry.

2. The voltage regulator of claim 1, wherein the voltage regulator circuitry includes switching circuitry, and the switching device is configured to electrically connect or disconnect the snubber circuit with the switching circuitry based upon the snubber control.

3. The voltage regulator of claim 2, wherein the snubber circuit includes a capacitor with a capacitance.

4. The voltage regulator of claim 3, wherein the switching device is a snubber transistor with a source-drain resistance when the snubber transistor is in an on state.

5. The voltage regulator of claim 4, wherein the snubber control is provided to a gate of the snubber transistor.

6. The voltage regulator of claim 5, wherein the snubber controller compares the one or more detected values with one or more thresholds and provides the snubber control based on the comparison of the one or more detected values with the one or more thresholds.

7. The voltage regulator of claim 2, wherein the snubber circuit is configured to be electrically connected to a voltage output of the switching circuitry.

8. A method comprising:
   performing voltage regulation with switching circuitry;
   monitoring the switching circuitry; and
   comparing data from the monitoring with one or more thresholds at a snubber controller, wherein the snubber controller is configured to control a switching device of a snubber circuit to electrically connect the snubber circuit to a voltage output of the switching based on the comparison of the data with the one or more thresholds, the one or more thresholds including a power output of the switching circuitry or one or more temperature values.

9. The method of claim 8, wherein the data indicates a load on the switching circuitry.

10. A semiconductor comprising:
    voltage regulator circuitry including switching circuitry;
    a snubber circuit including a switching device, the switching device configured to electrically connect or disconnect the snubber circuit with the switching circuitry based upon a snubber control; and a snubber controller configured to compares data to a threshold and provides the snubber control to the switching device based on the comparison of the data to the threshold, the data including on one or more detected values including a power output of the voltage regulator circuitry or a temperature in the vicinity of the switching circuitry.

11. The semiconductor of claim 10, wherein the switching device is a snubber transistor with a gate and a source-drain resistance when the snubber transistor is in the on state.

12. The semiconductor of claim 11, wherein the snubber controller is coupled to the gate of the snubber transistor.

13. The semiconductor of claim 12, further comprising monitoring circuitry, the monitoring circuitry monitoring a parameter of the switching circuitry, wherein the data from the monitoring is provided to the snubber controller.

14. The semiconductor of claim 13, wherein the monitoring circuitry is configured to monitor a power output of the switching circuitry.

15. The semiconductor of claim 13, wherein the monitoring circuitry is configured to monitor a temperature proximate to the switching circuitry.

16. The semiconductor of claim 13, wherein the snubber transistor is integrated with the switching circuitry.

* * * * *